(12) United States Patent
Tarne et al.

(10) Patent No.: US 6,443,582 B1
(45) Date of Patent: Sep. 3, 2002

(54) EDGE-LIT LIGHT ASSEMBLY WITH LIGHT GUIDING STRUCTURES

(75) Inventors: James D. Tarne, Utica; Edwin M. Sayers, Saline, both of MI (US)

(73) Assignee: Visteon Corporation, Dearborn, MI (US)

( * ) Notice: Subject to any disclaimer, the term of this patent is extended or adjusted under 35 U.S.C. 154(b) by 25 days.

(21) Appl. No.: 09/650,943

(22) Filed: Aug. 30, 2000

(51) Int. Cl.[7] .............................................. G01D 11/28
(52) U.S. Cl. ............................ 362/27; 362/31; 362/555
(58) Field of Search .............................. 362/26, 27, 31, 362/555, 545, 236, 237, 240, 241, 297, 327, 330, 336, 337, 338, 800, 339

(56) References Cited

U.S. PATENT DOCUMENTS

| 4,714,983 A |   | 12/1987 | Lang |
| 4,965,950 A |   | 10/1990 | Yamada |
| 5,136,483 A | * | 8/1992 | Schöniger et al. .......... 362/545 |
| 5,375,043 A |   | 12/1994 | Tokunaga |
| 5,422,751 A |   | 6/1995 | Lewis et al. |
| 5,590,945 A | * | 1/1997 | Simms ......................... 362/31 |
| 5,791,757 A |   | 8/1998 | O'Neil et al. |
| 5,876,107 A |   | 3/1999 | Parker et al. |
| 5,890,794 A |   | 4/1999 | Abtahi et al. |
| 6,102,559 A | * | 8/2000 | Nold et al. .................. 362/558 |
| 6,305,813 B1 | * | 10/2001 | Lekson et al. ................ 362/31 |

* cited by examiner

Primary Examiner—Sandra O'Shea
Assistant Examiner—Ismael Negron
(74) Attorney, Agent, or Firm—MacMillan, Sobanski & Todd, LLC

(57) ABSTRACT

A lamp for emanating light includes a light source and a lens having an axis. The lens has a radially outward light entering surface to introduce light from the light source into the lens in the form of an intra-lens beam. The light entering surface is at a radially outward edge of the lens. The lens also has an axially outward light exiting surface and a lens back surface, which has reflective stepped faces spaced apart by connecting faces. The reflective stepped faces are arranged at an angle to the lens axis to intercept the intra-lens beam and reflect a reflected beam through the axially outward light exiting surface.

12 Claims, 6 Drawing Sheets

EDGE-LIT LIGHT ASSEMBLY WITH LIGHT GUIDING STRUCTURES

TECHNICAL FIELD

This invention relates to an efficient means of and device for collimating and distributing light at the edge of a lens. One of a number of useful applications is in producing signal lights for automobiles.

BACKGROUND OF THE INVENTION

Lamps of the type used for signal lights typically are comprised of a light source, such as an incandescent bulb, a lens, and a reflector or collimating surface for directing the light toward the lens. Sometimes, more than one bulb is used. In some lamps, light-emitting diodes (LED's) are used instead of incandescent bulbs. LED's emit light in proportion to the forward current through the diode. LED's are low voltage devices that have a longer life than incandescent lamps. They respond quickly to changes in current. They produce a spectrum of light that is well defined and constrained.

The light sources are typically few and positioned near the center of the reflector or lens. It would be desirable to provide a lamp having multiple light sources at the edge of the lamp's lens.

SUMMARY OF THE INVENTION

The above objects as well as other objects not specifically enumerated are achieved by a lamp for emanating light, where the lamp comprises a light source and a lens having an axis. The lens has a radially outward light entering surface to introduce light from the light source into the lens in the form of an intra-lens beam. The light entering surface is at a radially outward edge of the lens. The lens also has an axially outward light exiting surface and a lens back surface, which has reflective stepped faces spaced apart by connecting faces. The reflective stepped faces are arranged at an angle to the lens axis to intercept the intra-lens beam and reflect a reflected beam through the axially outward light exiting surface.

According to this invention, there is also provided a lamp comprising a light source and a lens having an axis and spokes. The spokes have a radially outward light entering surface to introduce light from the light source into the lens in the form of an intra-lens beam. The light entering surface is at a radially outward edge of the lens. A lens back surface has reflective stepped faces spaced apart by connecting faces. The spokes have side surfaces. The lens includes an axially outward light exiting surface.

Various objects and advantages of this invention will become apparent to those skilled in the art from the following detailed description of the preferred embodiment, when read in light of the accompanying drawings.

DETAILED DESCRIPTION OF THE INVENTION

Figure 1:
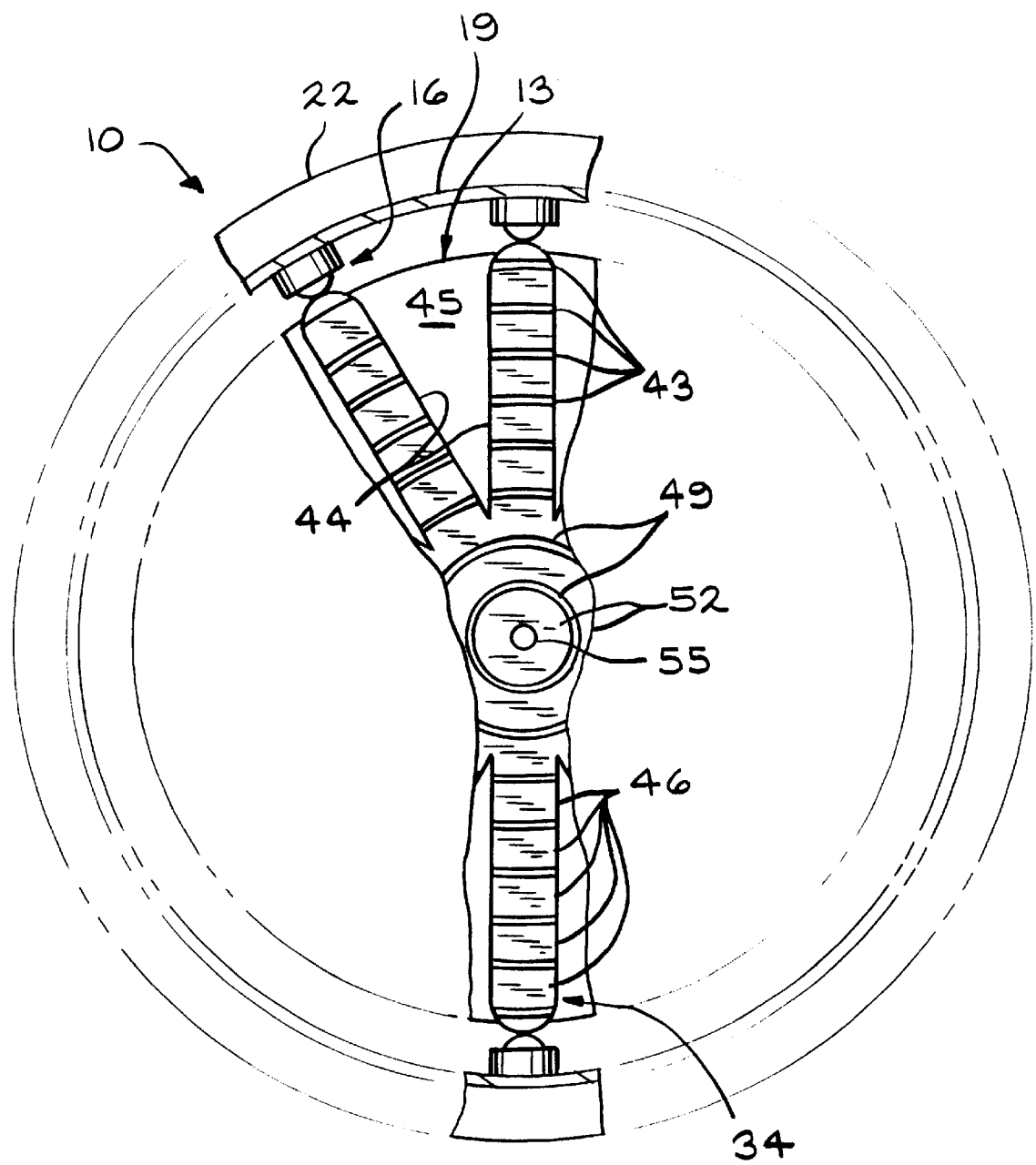
FIG. 1 is a plan view of an edge-lit lamp according to the invention.
Figure 2:
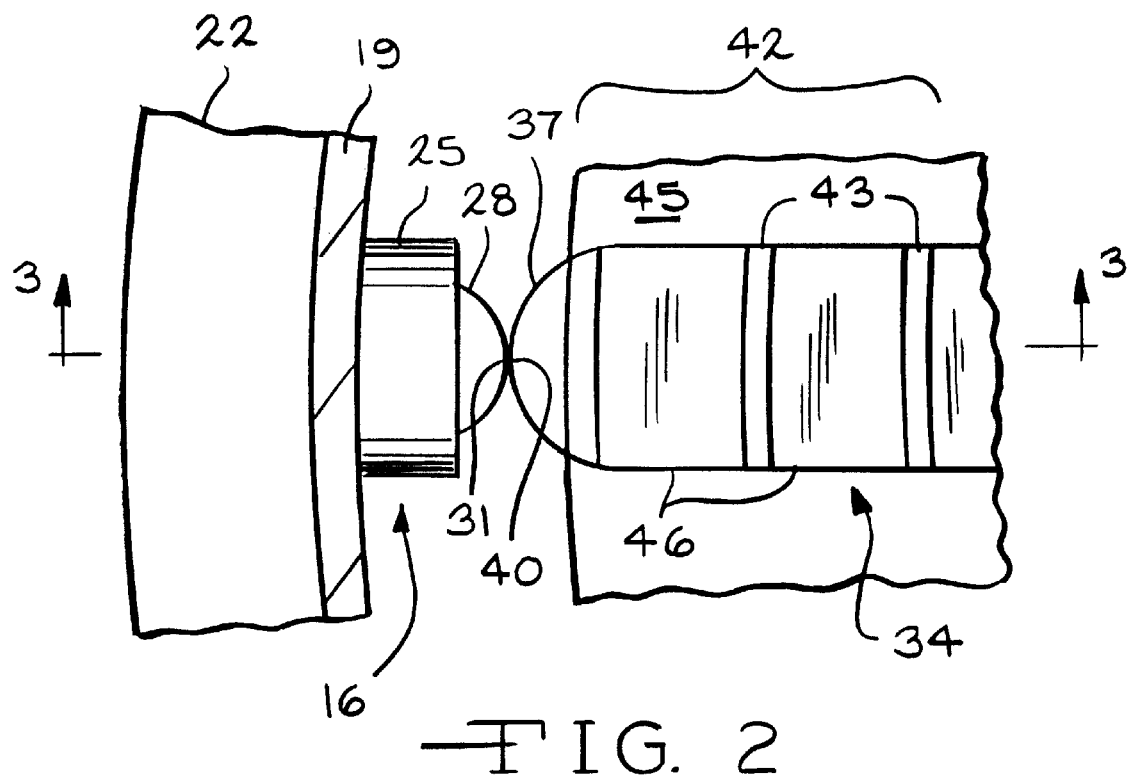
FIG. 2 is a more detailed plan view of an LED and radially outward end of a spoke.
Figure 3:
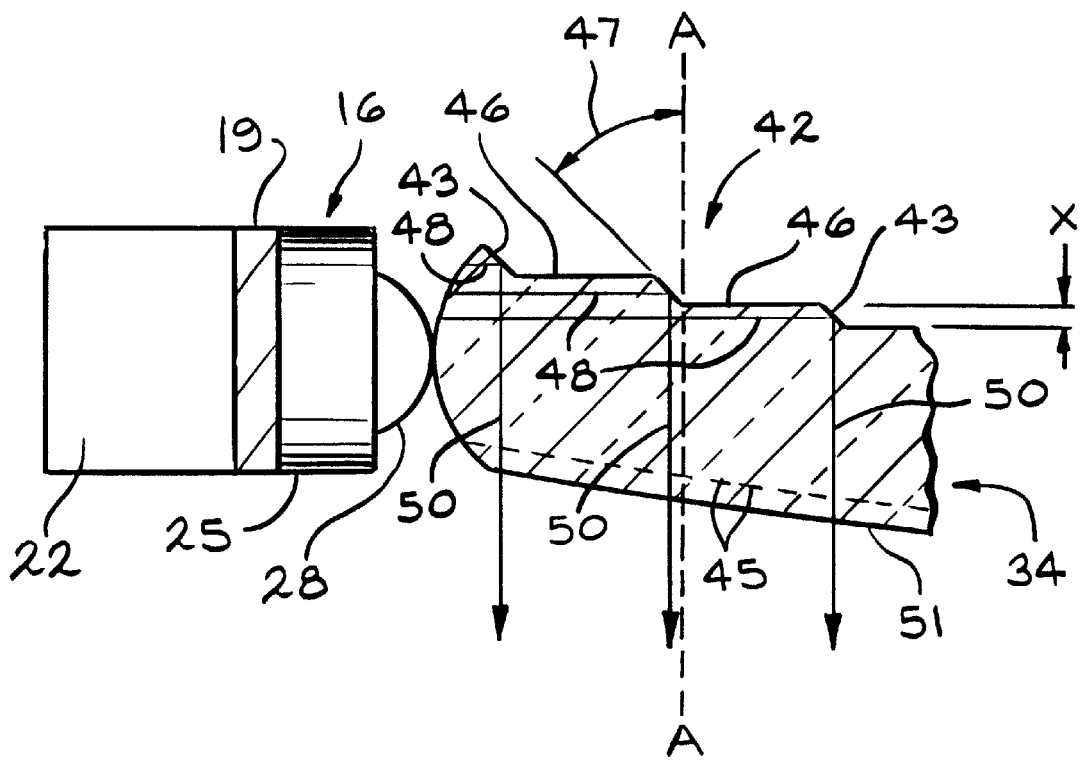
FIG. 3 is a cross-sectional view of FIG. 2 taken along line 3—3.

As shown in FIGS. 1–3, a lamp 10 includes a lens 13 for emanating light. The lens 13 is preferably circular, but may be non-circular. Radially outward to the lens 13 is a series of light sources, such as LED's 16. The LED's 16 include a body 25 which supports an LED lens 28. The LED lens surface is preferably hyperbolic, thus having an apex 31. The LED's 16 are connected to a radially outward substrate 19, which provides an electrical connection to power the LED's 16. A bezel 22 attaches to and surrounds the substrate 19. The bezel 22 is preferably circular but can be of any suitable shape to position the LED's 16 with respect to the substrate 19 and lens 13. The bezel 22 attaches the lamp 10 to an object such as an automobile (not shown).

A preferred embodiment of the lens 13 includes twelve radially extending spokes 34 although any number of spokes 34 can be used. For purposes of clarity, FIG. 1 shows only three spokes 34. At the radially outward edge of the spokes 34 is a light entering surface 37.

Radially inward to the light entering surface 37 of each spoke 34 is a lens back surface 42. The lens back surface 42 includes a series of reflective stepped faces 43 spaced apart by a series of connecting faces 46. The radial length of the connecting faces 46 may vary. The reflective stepped faces 43 and connecting faces 46 are preferably quadrilaterals, but can be of any suitable shape. A preferred embodiment of the spokes 34 includes seven reflective stepped faces 43 and six connecting faces 46. The reflective stepped faces 43 form an angle 47 with the lens axis "A" that is preferably within the range of from about 10 to about 60 degrees, more preferably about 30 degrees, as shown in FIG. 3.

The spokes 34 converge radially inwardly toward the center of the lens 13. Toward the center of the lens 13, the reflective stepped faces 43 are merged together to form a concentric reflective ring 49. The number of concentric reflective rings 49 will vary by the number and configuration of the spokes 34. In a similar fashion, at the center of the lens 13 the connecting faces 46 are merged together to form a concentric connecting ring 52. The presence of concentric connecting rings 52 is optimal, and if present the number of connecting rings 52 will vary by the number and configuration of the spokes 34. In a preferred embodiment, the spokes 34 converge to one or more concentric reflective rings 49 spaced apart by one or more concentric connecting rings 52. In a preferred embodiment a cone 55 is formed at the center of the lens 13.

Figure 7:
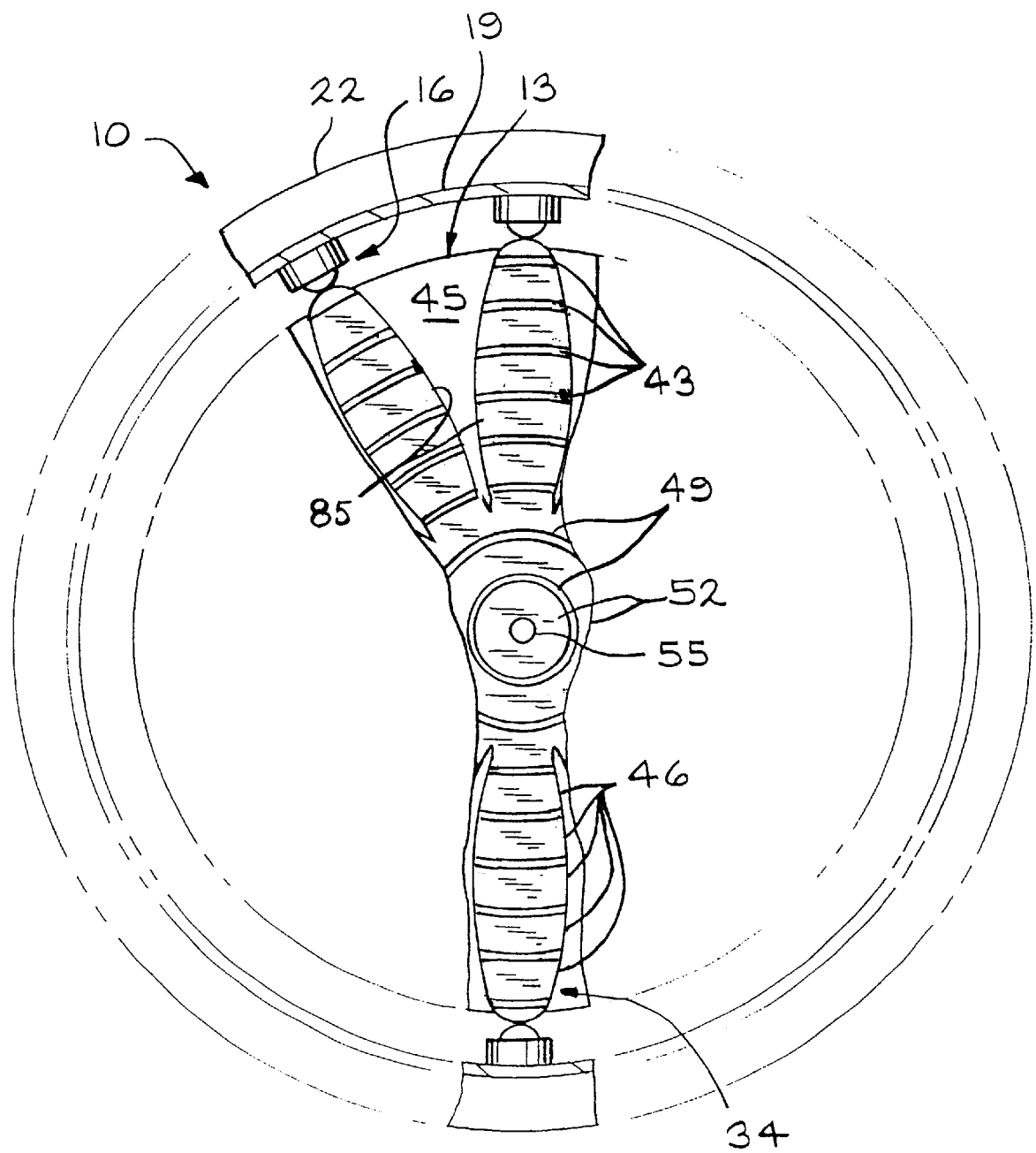
FIG. 7 is a plan view of an edge-lit lamp with spokes having curved side surfaces according to the invention.

The spokes 34 also have two side surfaces 44 each. The side surfaces 44 are preferably approximately linear, but the spokes 34 may have curved side surfaces 85 (as shown in FIG. 7), or may have any suitable contour. The side surfaces 44 for any two adjacent spokes 34 define a preferably perpendicular floor 45 extending therebetween. The floor 45 is preferably wedge shaped, forming an inclusive angle of within the range of from about 5 to 45 degrees. It should be understood that the inclusive angle will decrease in degrees as the number of spokes 34 in the lens 13 increases.

The light entering surface 37 for the spokes 34 is preferably hyperbolic, thus having an apex 40, as shown in FIG. 2. The apex 40 of the spokes 34 is positioned radially inward to the apex 31 of the LED lens 28. Preferably, the apex 40 of the spokes 34 contacts the apex 31 of the LED lens 28. In a preferred embodiment, the spokes 34 have a dedicated LED 16. The term "dedicated" means the light from a single LED 16 is projected into a single spoke 34, providing a one-to-one correspondence between each LED 16 and each spoke 34.

As can be seen from FIG. 3, the light entering the spoke 34 is in the form of an intra-lens beam 48, traveling radially inwardly. A portion of the intra-lens beam 48 strikes the first reflective stepped face 43 and is reflected out of the spoke 34 as a reflected beam 50 from the axially outward light exiting surface 51, which is on the opposite side of the lens 13 from the lens back surface 42. The axially outward light exiting surface 51 can be flat, curved, or any other suitable contour. Varying the contour of the axially outward light exiting surface 51 can vary the distribution of the reflected beam 50 along differing locations of the axially outward light exiting surface 51.

The distribution of the reflected beam 50 along differing locations of the axially outward light exiting surface 51 can also be modified by changing the length of the reflective stepped faces 43 and the angle 47 of the faces 43. It should be understood that the lengths of the connecting faces 46 and reflective stepped faces 43 used in the lens 13 can vary. Connecting faces 46 are spaced apart along the lens axis "A" by a step height "X", as shown in FIG. 3. At any given angle 47, as the length of the reflective stepped faces 43 increases, the step height "X" will increase. It should be understood that reflective stepped faces 43 of differing lengths can be used in the lens 13. Using reflective stepped faces 43 of differing lengths permits reflected beams 50 to vary in intensity at differing locations along the axially outward light exiting surface 51 radially from the perimeter of the lens 13 to the center of the lens 13.

The lens 13 can also include reflective stepped faces 43 oriented at a number of different angles 47. Using angles 47 of differing values permits reflected beams 50 to vary in intensity at differing locations along the axially outward light exiting surface 51. At any given length of the reflective stepped faces 43, as angle 47 decreases, the step height "X" will increase. In operation, the reflective stepped faces 43 intercept the intra-lens beam 48 and reflect the reflected beam 50 through the axially outward light exiting surface 51.

Figure 4:
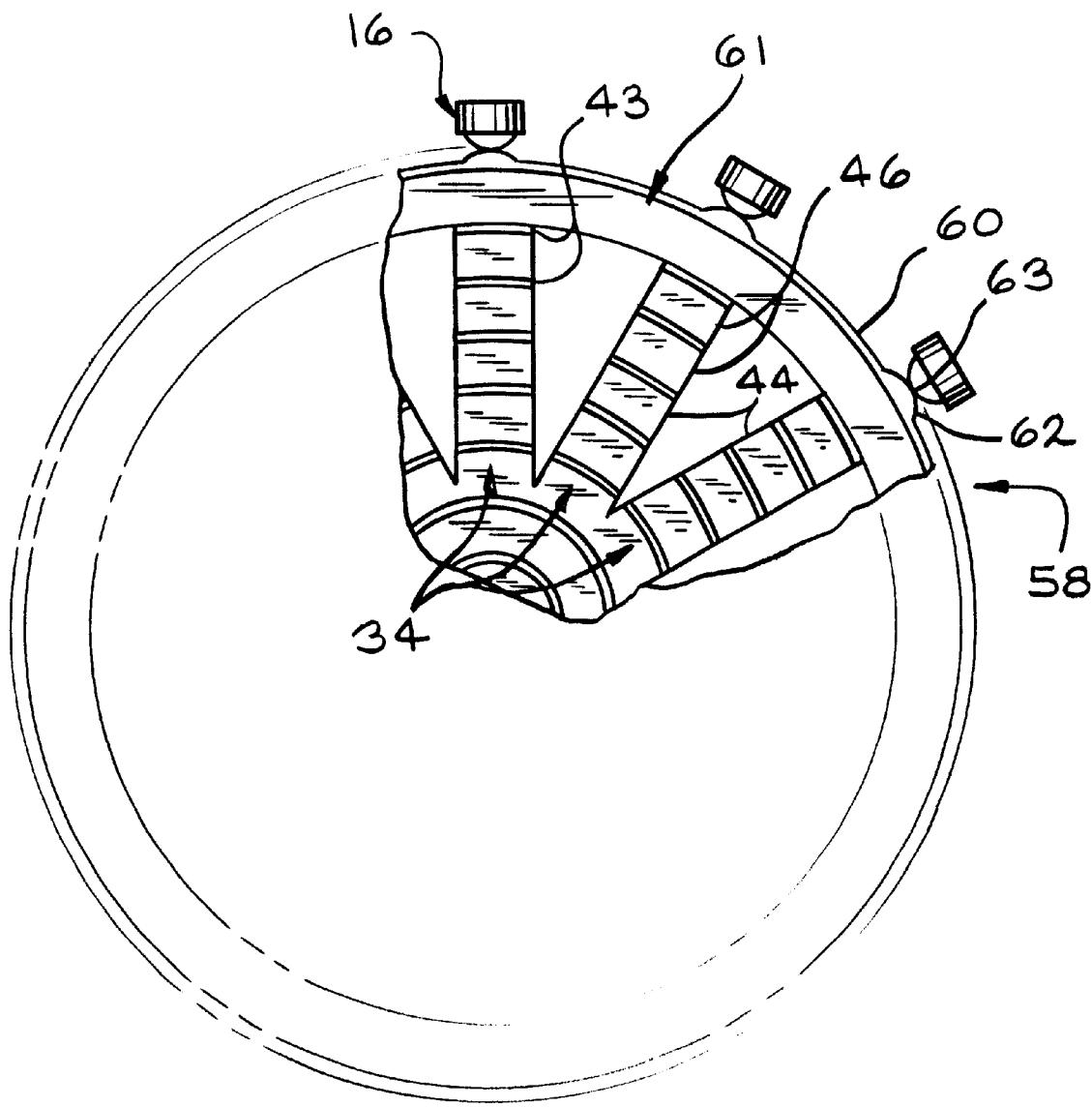
FIG. 4 is a plan view of an alternate embodiment of the lens of the lamp of FIG. 1.

FIG. 4 shows an alternate embodiment of the invention, in which a lens 58 includes a circumferential collar 61 provided for structural integrity. For purposes of clarity, only three spokes 34 are shown. The spokes 34 include the reflective stepped faces 43, the connecting faces 46, and the side surfaces 44 similar to those shown in FIG. 1. In a preferred embodiment the circumferential collar's radially outward surface 60 includes one or more radially outwardly extending hyperbolic nodes 62 each having an apex 63. The hyperbolic nodes 62 are light entering surfaces, similar to the light entering surfaces 37 shown in FIG. 1. Radially outward of the lens 58 is a series of light sources, such as LED's 16. In a preferred embodiment, the apices 63 of the hyperbolic nodes 62 contact the apices 31 of the lenses of the LED's 16.

Figure 5:
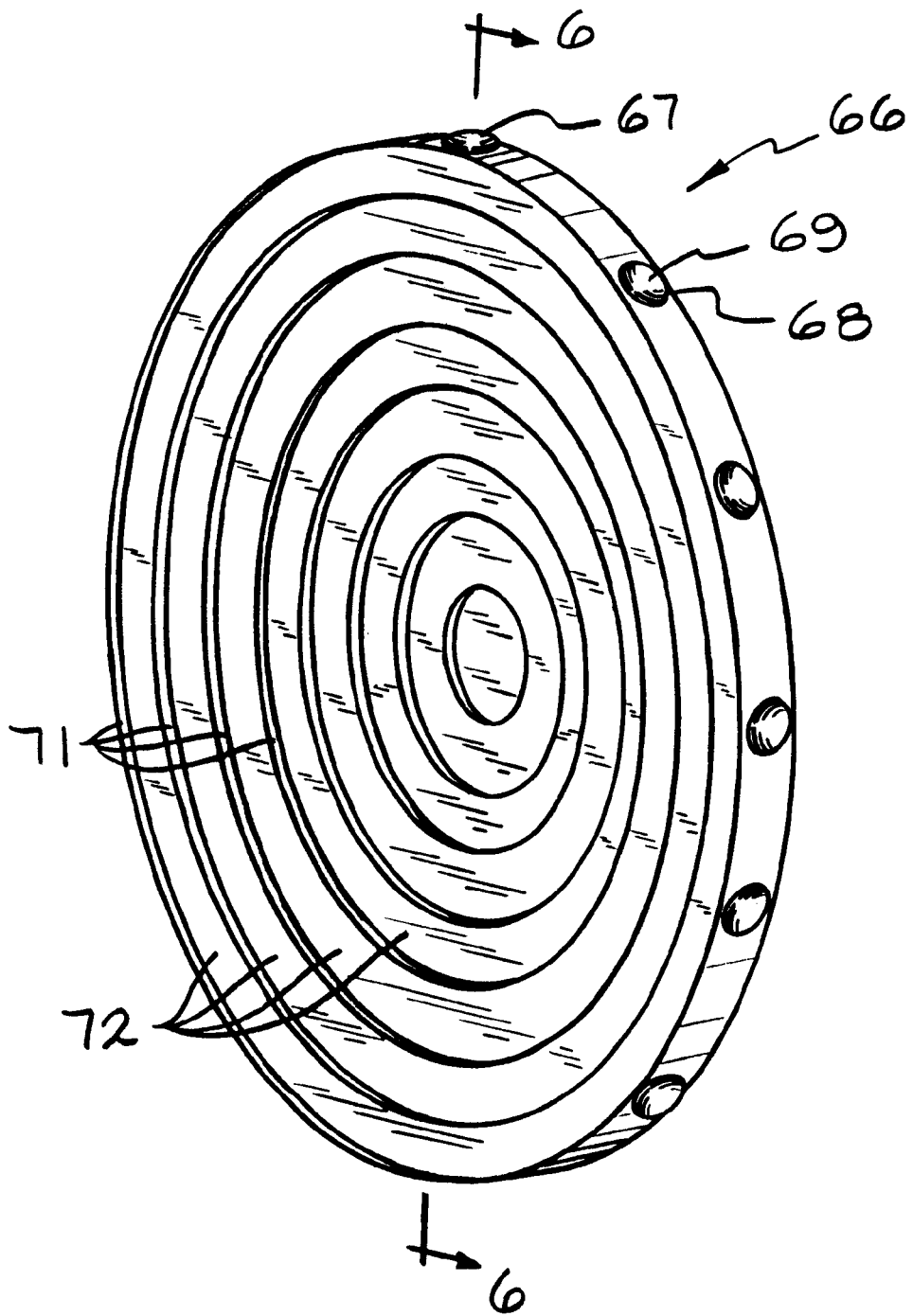
FIG. 5 is a perspective view of an different embodiment of the lens of the lamp of FIG. 1.
Figure 6:
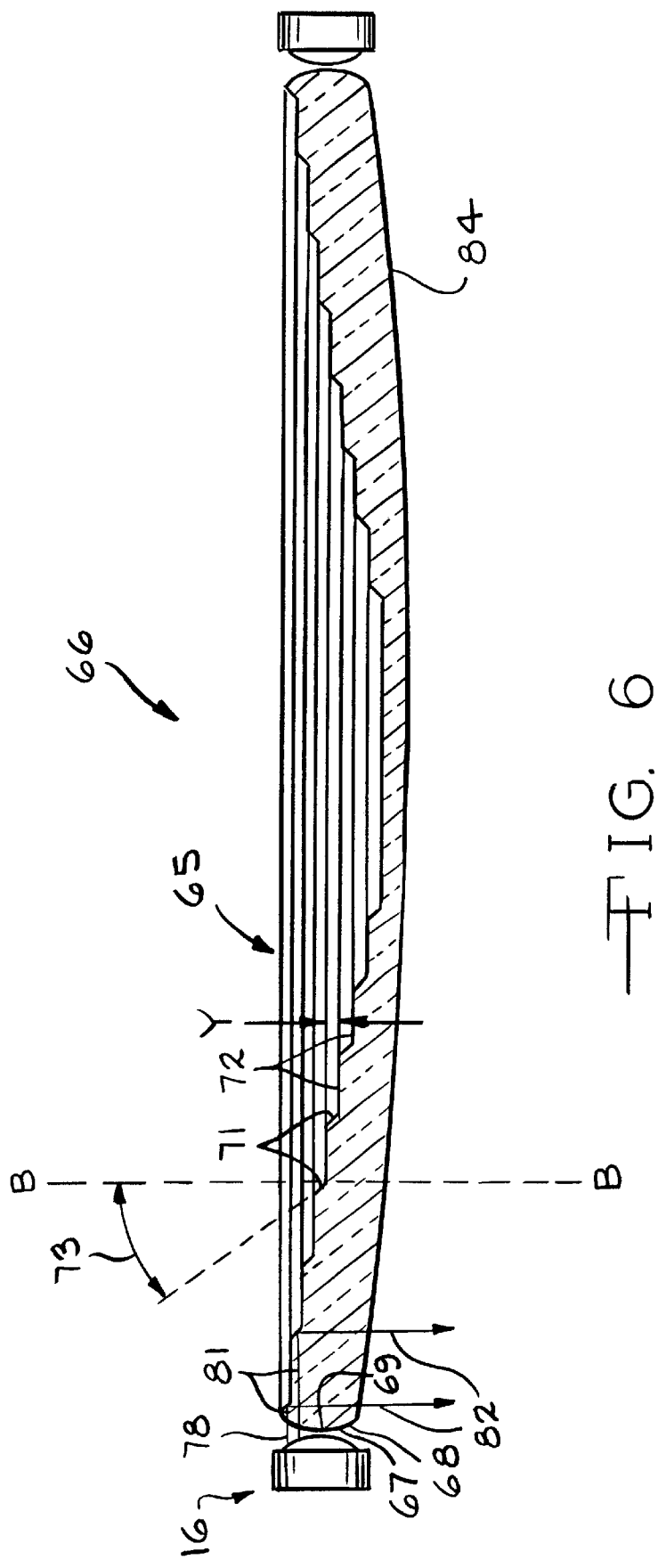
FIG. 6 is a cross-sectional elevational view of the lens of FIG. 5 taken along line 6—6.

FIGS. 5 and 6 show an alternate embodiment of the invention, in which the lens 66 has a lens back surface 65, similar to the lens back surface 42 shown in FIGS. 1–3. The lens back surface 65 has a plurality of reflective stepped faces 71 that are fully circumferential. There are no spokes. The lens 66 is preferably circular, but may be non-circular. The radially outer surface of the lens 66 is a light entering surface 67 at the outward edge of the lens 66. In a preferred embodiment the light entering surface 67 defines a radially outwardly extending hyperbolic surfaces 68 having apices 69. A plurality of reflective stepped faces 71 of the lens 66 are in the form of concentric reflective rings. A plurality of connecting faces 72 of the lens 66 are in the form of concentric connecting rings.

The reflective stepped faces 71 are separated radially by connecting faces 72. The reflective stepped faces 71 form an angle 73 with the lens axis "B" that is preferably within the range of from about 10 to about 60 degrees, more preferably about 30 degrees. The connecting faces 72 are preferably approximately perpendicular to lens axis "B." Lens axis "B" extends axially through the lens 66.

As can be seen from FIG. 6, some of the entry light 78 from the LED 16 strikes the light entering surface 67. The light entering surface 67 collimates the entry light 78 striking it. Entry light 78 enters the lens 66 in the form of an intra-lens beam 81. The intra-lens beam 81 extends radially inwardly approximately perpendicular to lens axis "B" and strikes the reflective stepped faces 71. A portion of the intra-lens beam 81 strikes the reflective stepped faces 71 and is reflected out of the lens 66 as a reflected beam 82. The reflected beam 82 exits the lens 66 through an axially outward light exiting surface 84 approximately parallel to lens axis "B." The axially outward light exiting surface 84 may be flat, curved or of any other suitable contour. Varying the contour of the axially outward light exiting surface 84 can vary the distribution of the reflected beam 82 along differing locations of the axially outward light exiting surface 84.

The distribution of the reflected beam 82 along differing locations of the axially outward light exiting surface 84 can also be modified by changing the length of the reflective stepped faces 71 and the angle 73. It should be understood that the lengths of the connecting faces 72 and the reflective stepped faces 71 used in the lens 66 can vary. The connecting faces 72 are spaced apart along the lens axis "B" by a step height "Y". At any given angle 73, as the length of the reflective stepped faces 71 increases, the step height "Y" will increase. Similarly, the reflective stepped faces 71 of differing lengths can be used in the lens 66. Using reflective stepped faces 71 of differing lengths permits reflected beams 82 to vary in intensity at differing locations along the axially outward light exiting surface 84.

The lens 66 can also include reflective stepped faces 71 oriented at a number of different angles 73 with respect to adjacent connecting faces 72. Using angles 73 of differing dimensions permits reflected beams 82 to vary in intensity at differing locations along the axially outward light exiting surface 84. At any given length of the reflective stepped faces 71, as angle 73 decreases, the step height "Y" will increase.

The lens of the invention is preferably manufactured from an optically clear medium. When manufacturing the lens, a material what will be optically clear when hardened can be injected into a mold and allowed to harden. A multi-part thermoset manufacturing molding method can also be used, wherein an epoxy resin is cured in a mold to form an optically clear solid. When using the multi-part thermoset manufacturing method, the epoxy resin must be mixed very well and stabilized. Failure to do so can result in cloudy and optically uneven and less optically efficient lenses.

Injection-compression molding is yet another way the lens of the invention can be manufactured. Using this technique, a liquid is injected into an open mold. When the mold is shut, the portion of the mold covering the mold opening compresses the material inside and completes the mold. Using the injection-compression method allows for better cooling in the manufacturing process and produces less stress on the lens.

The lens of the invention can be manufactured from clear polyurethane, which avoids uneven cooling, shrinking, sinking or pitting surfaces. The lens of the invention can also be manufactured from optically clear glass or any other optically clear substance.

The principle and mode of operation of this invention have been described in its preferred embodiments. However, it should be noted that this invention may be practiced otherwise than as specifically illustrated and described without departing from its scope.

What is claimed is:

1. A lamp for emanating light comprising:
   a. a light source; and
   b. a lens having an axis, the lens having:
      a radially outward light entering surface to introduce light from the light source into the lens in the form of an intra-lens beam, the light entering surface being at a radially outward edge of the lens;
      an axially outward light exiting surface; and
      a lens back surface having reflective stepped faces spaced apart by connecting faces, the reflective stepped faces and connecting faces form concentric rings;
      wherein the reflective stepped faces are arranged at an angle to the lens axis to intercept the intra-lens beam and reflect a reflected beam through the axially outward light exiting surface.

2. The lamp of claim 1 wherein the angle between the lens axis and the reflective stepped faces is within the range of from about 10 to about 60 degrees.

3. The lamp of claim 1 in which said connecting faces that are adjacent are spaced apart axially by step heights, and wherein the step heights between some adjacent pairs of connecting faces differ from the step heights of other adjacent pairs of connecting faces.

4. The lamp of claim 1 wherein the axially outward light exiting surface is curved.

5. The lamp of claim 1 wherein the length of the connecting faces differs radially from the perimeter of the lens to the center of the lens.

6. A lamp comprising:
   a. a light source;
   b. a lens having an axis and spokes, the spokes having:
      a radially outward light entering surface to introduce light from the light source into the lens in the form of an intra-lens beam, the light entering surface being at a radially outward edge of the lens;
      a lens back surface having reflective stepped faces spaced apart by connecting faces; and
      side surfaces;
   wherein the lens includes an axially outward light exiting surface.

7. The lamp of claim 6 wherein the lens is comprised of spokes having said reflective stepped faces and connecting faces.

8. The lamp of claim 6 wherein each spoke has a dedicated light source.

9. The lamp of claim 6 wherein the side surfaces are curved.

10. The lamp of claim 6 wherein at least two spokes converge to form a concentric reflective ring spaced apart by a concentric connecting ring.

11. The lamp of claim 6 further comprising approximately wedge-shaped floors between the spokes in the lens.

12. The lamp of claim 6 wherein the spokes have approximately linear side surfaces.

* * * * *